United States Patent

Ohkubo

[11] Patent Number: 5,251,584
[45] Date of Patent: Oct. 12, 1993

[54] TWO CYCLE ENGINE

[75] Inventor: Akihiko Ohkubo, Iwata, Japan

[73] Assignee: Yamaha Hatsudoki Kabushiki Kaisha, Iwata, Japan

[21] Appl. No.: 974,983

[22] Filed: Nov. 12, 1992

Related U.S. Application Data

[63] Continuation-in-part of Ser. No. 734,497, Jul. 23, 1991, abandoned.

[30] Foreign Application Priority Data

Jul. 13, 1990 [JP] Japan ............... 2-201250

[51] Int. Cl.⁵ ........................... F02B 33/04
[52] U.S. Cl. ...................... 123/73 V; 123/73 PP
[58] Field of Search .......... 123/73 V, 73 PP, 65 R, 123/73 R, 73 A, 73 B, 73 C

[56] References Cited

U.S. PATENT DOCUMENTS

| | | | |
|---|---|---|---|
| 2,067,715 | 1/1937 | Kylen | 123/73 V |
| 2,639,699 | 5/1953 | Kiekhaeffer | 123/73 V |
| 3,815,559 | 6/1974 | Anderson | 123/73 V |
| 4,690,109 | 9/1987 | Ogasahara et al. | 123/73 PP |
| 4,879,974 | 11/1989 | Alvers | 123/73 PP |
| 4,892,066 | 1/1990 | Brown | 123/73 V |
| 4,898,127 | 2/1990 | Phillips et al. | |

FOREIGN PATENT DOCUMENTS

| | | |
|---|---|---|
| 0060802 | 9/1982 | European Pat. Off. . |
| 2855445 | 7/1979 | Fed. Rep. of Germany . |
| 51-79818 | 7/1976 | Japan . |
| 56-11624 | 3/1981 | Japan . |
| 59-18229 | 1/1984 | Japan . |
| 1-105726 | 7/1989 | Japan . |
| 2022699 | 12/1979 | United Kingdom . |

*Primary Examiner*—E. Rollins Cross
*Assistant Examiner*—M. Macy
*Attorney, Agent, or Firm*—Ernest A. Beutler

[57] ABSTRACT

Two embodiments of two cycle, crankcase compression engines wherein exhaust emissions are controlled by controlling the amount of scavenging air flow at low and mid ranges. The scavenging air flow is controlled by balance passages that interconnect at least two crankcase chambers of the engine and in which a control valve is provided. In one embodiment, the balance passage is positioned above the crankcase chambers and communicates with them through downwardly extending passages so as to preclude the likelihood of condensation of fuel or lubricant in the balance passages and to return any fuel or lubricant to the crankcase chambers.

20 Claims, 8 Drawing Sheets

TWO CYCLE ENGINE

CROSS REFERENCE TO RELATED APPLICATION

This application is a continuation-in-part of my copending application entitled "Two Cycle Engine", Ser. No. 734,497, filed Jul. 23, 1991, now abandoned, and assigned to the Assignee hereof.

BACKGROUND OF THE INVENTION

This invention relates to a two cycle engine and more particularly to a two cycle engine construction that will improve the running performance of the engine.

As is well known, two cycle engines operating with direct cylinder injection tend to have a very lean mixture in the combustion chamber at the time of ignition when under light and mid-range loads and this can cause high combustion temperatures which result in the formation of large amounts of NOX in the exhaust gases and also the likelihood of knocking. This problem is particularly prevalent in connection with diesel engines. In order to preclude these problems, an arrangement has been provided for throttling the intake air flow or the air flowing through the scavenge passage under light load conditions. This can be conveniently done by providing a throttle valve in the intake passage that serves the crankcase chambers and which will restrict the air flow under low load and low speed conditions.

Although the aforedescribed type of construction is effective in limiting the amount of NOX emissions and also reducing the likelihood of knocking, it gives rise to another problem. In a two cycle engine during the time when the scavenge port is opened, there can be a time when the pressure in the crankcase chamber is negative when intake air throttling is employed. If this occurs, then the exhaust gases can flow back through the scavenge passage to the crankcase chamber giving rise to further problems.

It is, therefore, a principal object to this invention to provide a two cycle crankcase compression engine operating in way so as to avoid NOX emissions and knocking while at the same time preclude the flow of exhaust gases back into the crankcase chambers.

It is a further object to this invention to provide an arrangement for operating a two cycle crankcase compression engine so as to reduce NOX emissions, knocking and other poor running, particularly at low speed conditions.

The aforenoted objectives can be met by providing a balance passage that interconnects the crankcase chambers of the engine and which has valving which is opened at low and mid range speeds so as to reduce the amount of scavenging in the engine without causing backflow of exhaust gases from the combustion chamber to the crankcase chamber through the scavenge port. When this is done, however, if the balance passage is positioned so that it is below the crankcase chamber or if any portions of the interconnecting passageways have downwardly inclined portions, then any lubricant or fuel which tends to condense in the crankcase chambers may flow back into this balance passage system with obvious disadvantages.

It is, therefore, a still further object to this invention to provide an improved balance system interconnecting plural crankcase chambers of a two cycle engine and in which the system is configured so that lubricant or fuel cannot collect in the balance system.

SUMMARY OF THE INVENTION

A first feature of this invention is adapted to be embodied in a two cycle, crankcase compression, internal combustion engine having two combustion chambers and two crankcase chambers. In accordance with the invention, a balance passage extends between the crankcase chambers and throttle valve means are provided in this balance passage. The throttle valve means is opened at low and mid range speeds so as to reduce the amount of scavenging in the engine without causing back flow of exhaust gases from the combustion chamber to the crankcase chamber through the scavenge port.

Another feature of this invention is also adapted to be embodied in a two cycle, crankcase compression, internal combustion engine having at least two crankcase chambers to which an air charge is admitted and scavenge passages for transferring the charge from the crankcase chambers to a combustion chamber. In accordance with this feature of the invention, balance passage means are providing and communicating conduits each communicate at one end with the balance passage means and at the other end with a respective one of the crankcase chambers. The communicating conduits extend upwardly from their other ends toward their one ends so that lubricant cannot collect therein.

DETAILED DESCRIPTION OF THE PREFERRED EMBODIMENTS OF THE INVENTION

Referring first in detail to FIGS. 1 through 4, a three cylinder, inline, two cycle, crankcase compression, diesel engine constructed in accordance with an embodiment of the invention, as identified generally by the reference numeral 21. Although the invention is described in conjunction with an engine of this type, it is to be understood that the invention has applicability in engines operating on different principals and having different numbers of cylinders or, in fact, rotary engines. However, the invention is employed with engines having at least two cylinders and operating on the two stroke principal.

Figure 1:
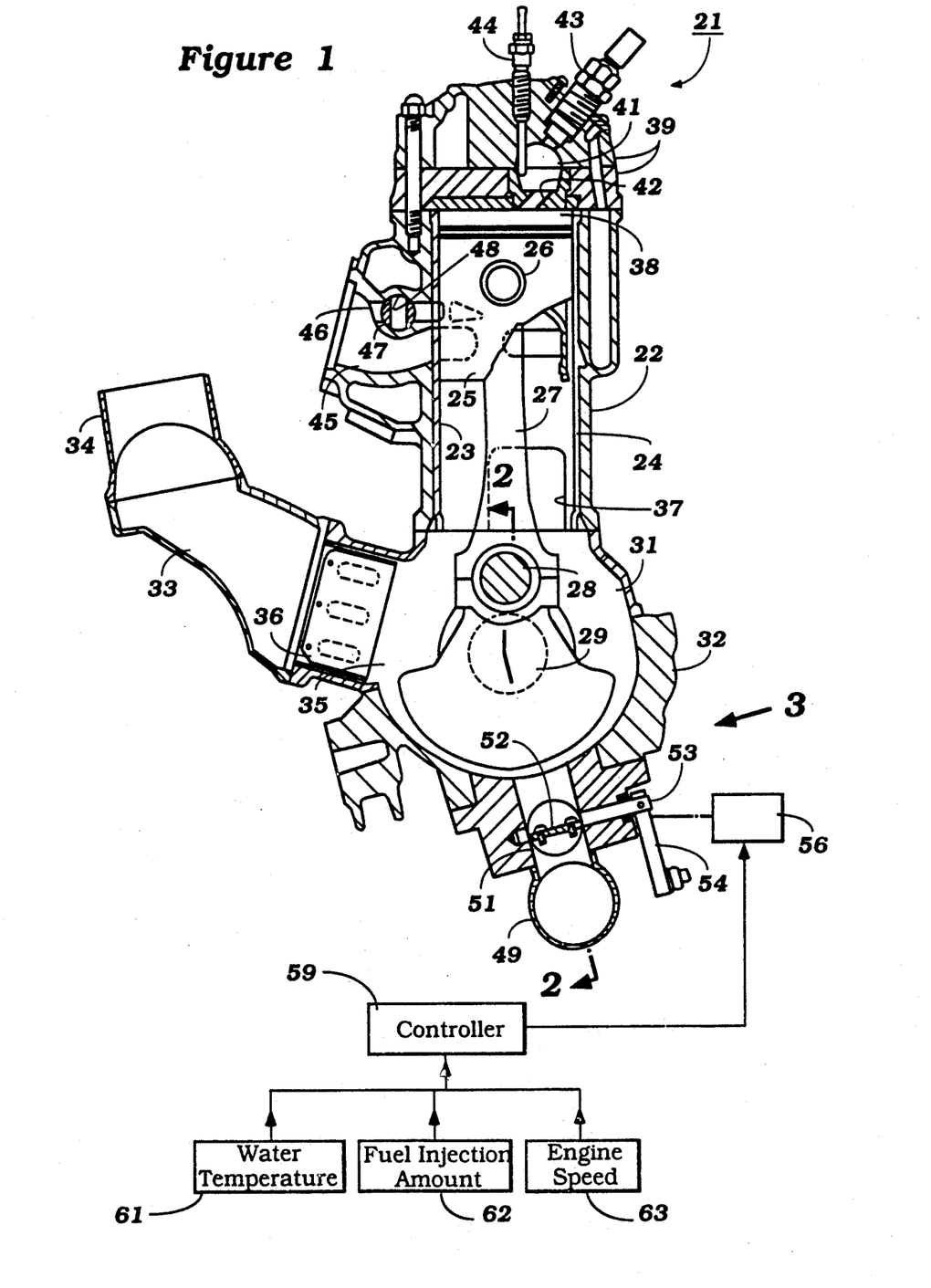
FIG. 1 is a cross sectional view taken through a single cylinder of a three cylinder, inline, two cycle, crankcase compression, diesel engine constructed in accordance with an embodiment of invention, with certain components shown schematically.
Figure 2:
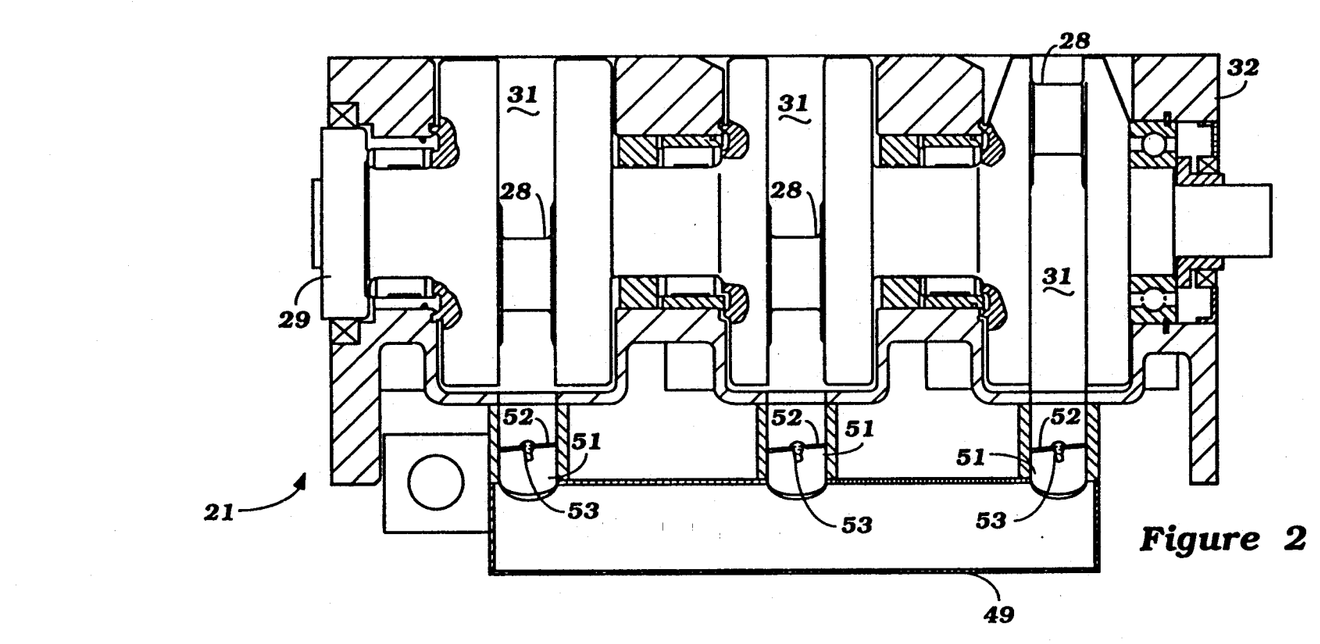
FIG. 2 is an enlarged cross sectional view taken along the line 2—2 of FIG. 1.
Figure 3:
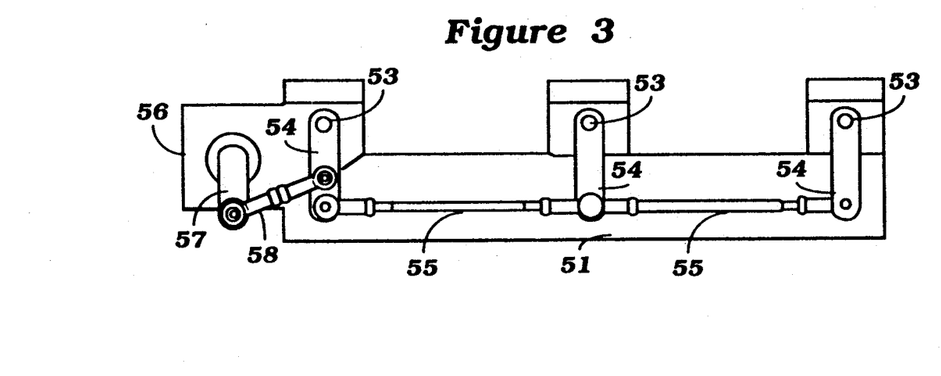
FIG. 3 is a view taken in the direction of the arrow 3 in FIG. 2.

The engine 21 has a cylinder block assembly 22 which, in the illustrated embodiment, has three aligned cylinder bores 23 formed by respective cylinder liners 24. A piston 25 is supported for reciprocation in each cylinder bore 23 and is connected by means of a piston pin 26 to a respective connecting rod 27. The connecting rod 27 has its lower end journalled on a respective throw 28 of a crankshaft 29.

The crankshaft 29 is supported for rotation within a crankcase chamber 31 formed at the base of the cylinder block 22 by the skirt of the cylinder block and by a crankcase member 32 that is affixed in a known manner to the cylinder block 22. As is typical with two cycle engine practice, the crankcase chamber 31 associated with each of the cylinder bores 23 is sealed from the adjacent crankcase chambers.

An air charge is delivered to each of the crankcase chambers 31 from an air induction system that includes an air cleaner and air silencer (not shown) which supplies air to an intake manifold 33 through an inlet 34. The manifold 33, in turn, delivers a charge to the individual chambers 31 through intake ports 35 in which reed type check valves 36 are interposed to preclude reverse flow when the charge in the crankcase chambers 31 is being compressed.

As is well known, when the pistons 25 move upwardly from bottom dead center a reduced pressure will be experienced in the crankcase chambers 31 and the intake air charge will flow into them past the reed type check valves 36. As the pistons 25 begin their downstrokes, the charge will be compressed, the reed type check valves will be closed and eventually the compressed charge will be transferred through scavenge ports 37 to the area in the cylinder bores 23 above the heads of the pistons 25.

This area, indicated by the reference numeral 38 constitutes the combustion chamber for each cylinder and is formed by the cylinder bore 24, head of the piston 25 and a cylinder head assembly, indicated generally by the reference numeral 39 which is affixed to the cylinder block 22 in an appropriate manner.

In the illustrated embodiment, the cylinder head assembly 39 is of a multi part type and includes a pre-chamber or torch chamber 41 which communicates with the main combustion chamber 38 through a restricted throat 42. As the pistons 25 continue their upward stroke, the transferred charge will be further compressed both in the main combustion chamber 38 and in the pre-combustion chamber 41. A fuel charge is injected into the pre-combustion chamber 41 by a cylinder head mounted fuel injector 43, at the appropriate time. When this occurs, the highly compressed fuel air charge will burn and issue from the throat 42 into the main combustion chamber 39 to drive the piston 25 downwardly.

A glow plug 44 may be provided in the pre-combustion chamber 41 so as to assist in cold starting and warm up operation.

The exhaust gases from the expanding charge are discharged through a main exhaust port 45 into an exhaust system (not shown) in a known manner. If desired, the engine may also be provided with a sub or auxiliary exhaust port 46 which communicates with the main exhaust port 45 and the cylinder bore 23 at a point above the point of communication of the main exhaust port 45 with the cylinder bore. An exhaust control valve 47 is positioned in a cross bore 48 and controls the opening and closing of the auxiliary exhaust port 46 so as to control the compression ratio of the engine. Any desired control strategy may be employed for the exhaust control valve 47, as is well known in this art.

In a typical diesel engine having a constructions as thus far described, there are certain problems in connection with the control of exhaust gas emissions and engine running, particularly at low and mid range conditions. By low and mid range, it is referred to the load on the engine. The reason for this is that at low and mid range performance, the amount of fuel injected into the combustion chamber 38 in relation to the air volume is relatively small. This excess air gives rise to high combustion chamber temperatures which can give rise to the emissions of nitrous oxides in the exhaust and also high temperatures can cause knocking. In addition, particulate control can become difficult in this area.

Figure 5:
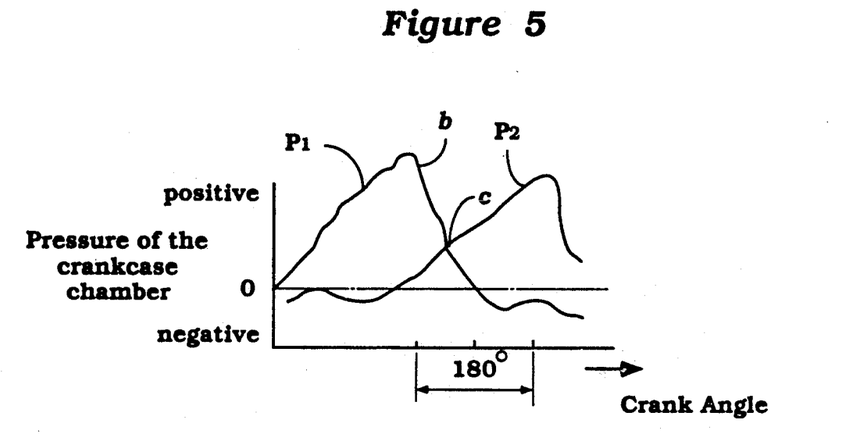
FIG. 5 is a graphical view showing the crankcase pressure in two of the crankcases in relation to crank angle.

It has been proposed to control the amount of nitrous oxide and particulates in the exhaust gases by throttling the amount of scavenge air flowing through the scavenge passages 37. This has been done in connection with prior art constructions by throttling the intake air flowing through the intake manifold 33. However, as may be seen in FIG. 5, there is a time in the operation of a normal engine where the crankcase pressure can be less than atmospheric. FIG. 5 shows the pressure curves $P_1$ and $P_2$ from two cylinders of the engine during crankshaft rotation. It can be seen that each of these curves fall into the negative area, particularly when there is throttling of the intake charge. If a negative pressure occurs, then the exhaust gases may actually be drawn back into the crankcase chambers 31 through the scavenge ports 37. Hence, the next intake air charge will be diluted and poor performance will result.

Figure 4:
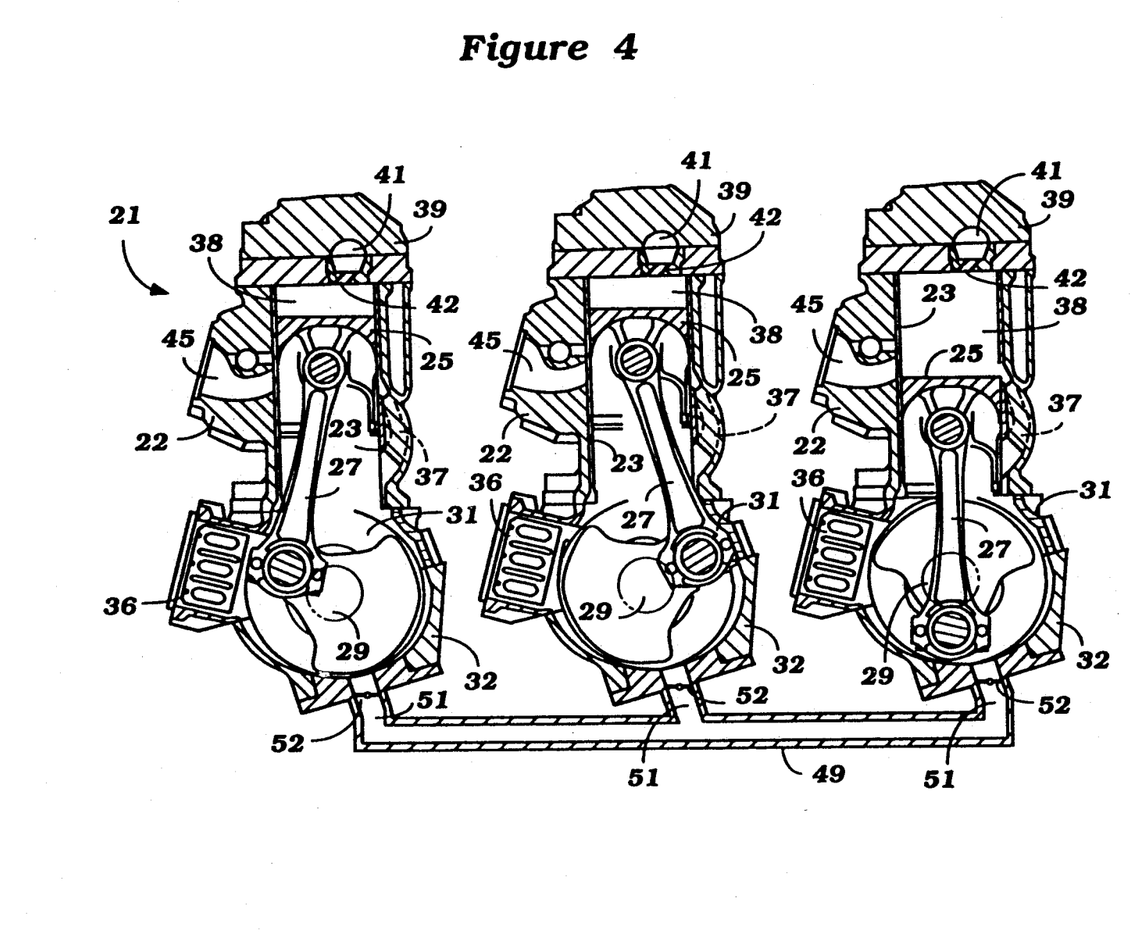
FIG. 4 is a partially schematic cross sectional view showing how the balance passage interconnects the crankcase chambers of the various cylinders.

Therefore, in order to throttle the scavenge air without causing the existence of negative pressures in the crankcase chambers 31, a balance passage arrangement, indicated generally by the reference numeral 49 is provided. The balance passage 49 includes individual communicating passageways 51, each of which communicates with a respective one of the crankcase chambers 31. Throttle valves 52, which are controlled in a strategy which will be described, are positioned in the passages 51 for controlling the communication of the individual crankcase chambers 31 with each other.

When the crankcase chambers 31 are communicated with each other through the opening of the throttle valves 52, two things will occur. First, the amount of scavenge air flowing through the passages 37 will be decreased because the amount of air that flows into the crankcase chambers 31 will be reduced. This is because part of the intake air charge that is drawn in will flow to another chamber through the balance passage 49.

Hence, the scavenging air flow will be reduced. Also, during such times as there tends to be negative pressure developed in the individual crankcase chambers 31 rather than the exhaust gases being drawn through the scavenge ports 37, air will be drawn from another crankcase chamber through the balance passage 49. Hence, the amount of scavenge air flow may be throttled while, at the same time, precluding the flow of exhaust gases back into the crankcase chambers.

The throttle control valves 52 are each supported on a respective throttle valve shafts 53 that is journalled in the balance passage 49 in an appropriate manner. Control levers 54 (FIG. 3) are affixed to each of the throttle valve shafts 53 and are connected by means of a linkage system 55. This linkage system 55 is operated by means of a servo motor 56 of the stepper type which operates a control arm 57 that is connected to one of the throttle levers 54 through a link 58.

Referring to FIG. 1, the stepping motor 56 is operated by means of a controller 59 which receives certain input signals indicative of engine performance. In the illustrated embodiment, the engine condition signals are a temperature signal 61 which may be the temperature of the water in the cooling jacket of the engine 21, a fuel injection amount signal 62 and an engine speed signal 63. The signals 62 and 63 may be provided by any suitable sensors. The fuel injection amount signal 62 will be indicative of engine load.

Particularly the operation is controlled in such a way so as to open the control valves 52 at low and mid load conditions so as to decrease the amount of scavenging air flow and to close the control valves 52 at higher load conditions so as to achieve maximum power output.

Figure 6:
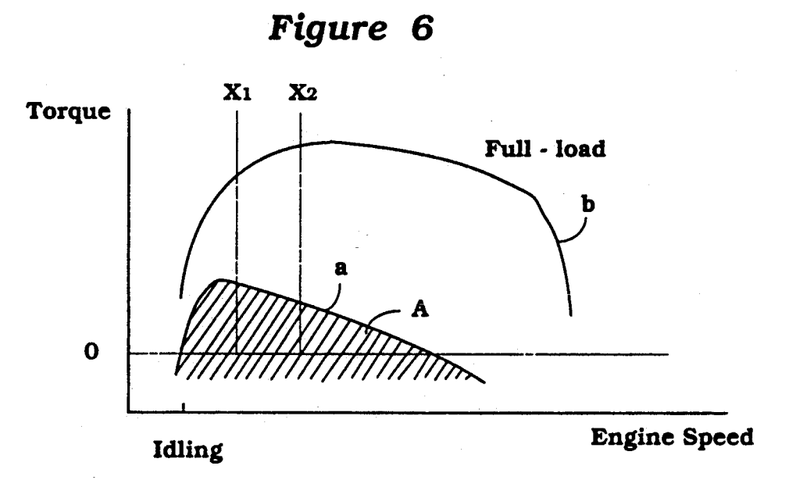
FIG. 6 is a graphical view showing the torque versus engine speed curves.

Referring to FIG. 6, the solid line curve in this figure identified as b is the torque curve for the engine in relation to engine speed under full load conditions. The area of the curve under the line a indicated by the shaded area A is the area in which the control valves 52 are opened either partially or fully. As may be seen, this operating range is when the engine is at idle and low speed and the operation of the control valves is decreased as the speed and load of the engine increases so that the engine will operate in a conventional manner under high load conditions.

Figure 13:
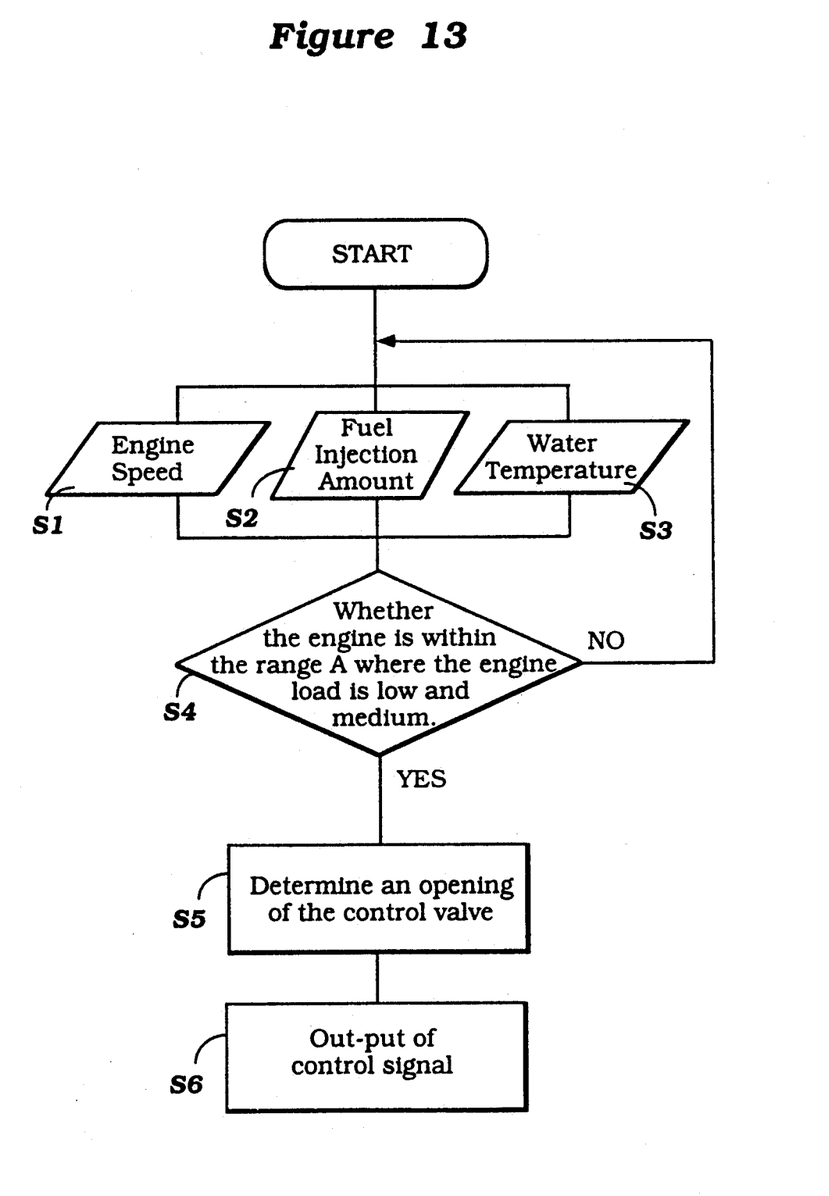
FIG. 13 is a block diagram showing the control routine.

The control routine may be understood by reference to FIG. 13 wherein when the program is started, it moves to the steps $S_1$, $S_2$ and $S_3$ so as to instantaneously sense the engine conditions, engine speed, fuel injection amount and water temperature, respectively in the illustrated embodiment. The program then moves to the step $S_4$ to determine if the engine is operating within the range A where the engine load is low and medium. If the engine is not operating in this range, the program merely repeats.

If, however, at the step $S_4$ the engine is operating in the range A then the program moves the step $S_5$ to determine from the controller 59 the desired opening of the control valves 52. Once the control valve opening amount is determined, the program moves to the step $S_6$ to output a signal to the servo motor 56 to appropriately position the control valves 52 and to limit the amount of scavenging air flow.

Figure 7:
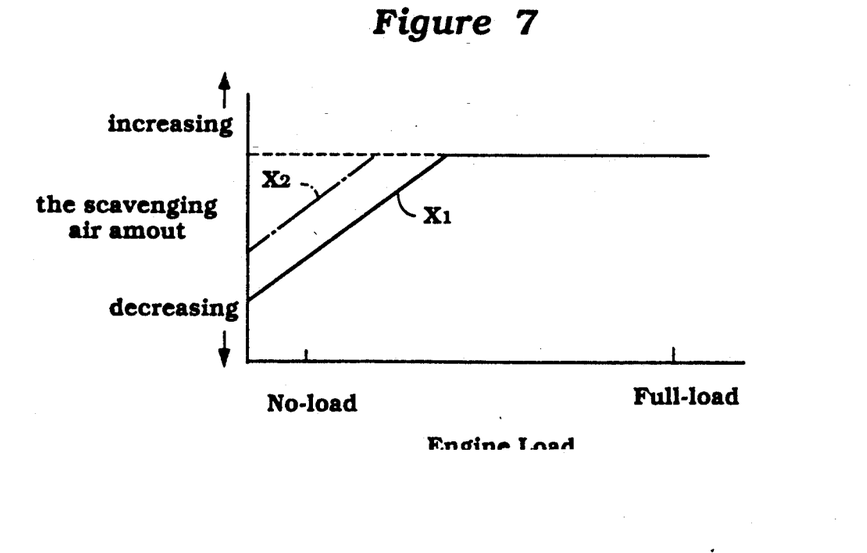
FIG. 7 is a graphical view showing the amount of scavenging air in relation to engine load.

FIG. 7 is a graphical view showing how the amount of scavenging air flow is controlled in relation to engine speed with two points, $X_1$ and $X_2$ being shown. At the point $X_1$, there is a greater reduction in scavenging air flow for a larger range of engine load than at the point $X_2$. The effect of this in relation to engine performance will now be described by reference to FIGS. 8 through 12 wherein these two control points $X_1$ and $X_2$ are depicted in conjunction with various emissions parameters.

Figure 8:
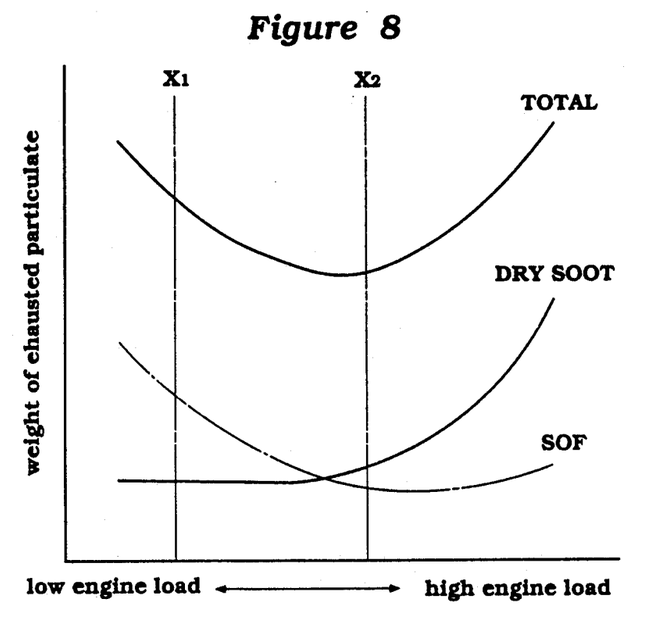
FIGS. 8 through 10 are graphical views showing the amount of exhaust gas particulates in relation to engine load in accordance with a conventional engine (FIG. 8) and in accordance with variations in operation of the embodiment of the invention (FIGS. 9 and 10).
Figure 9:
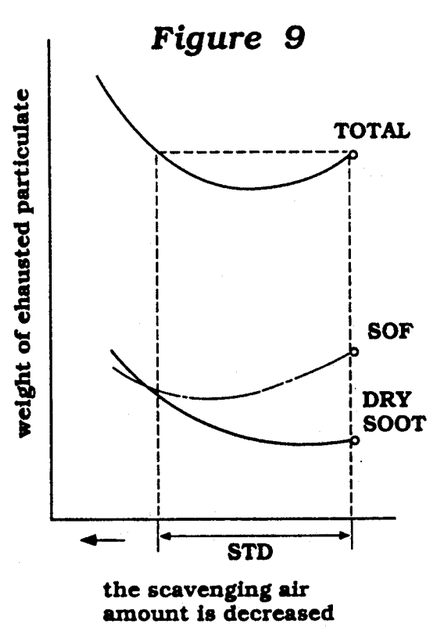
Figure 10:
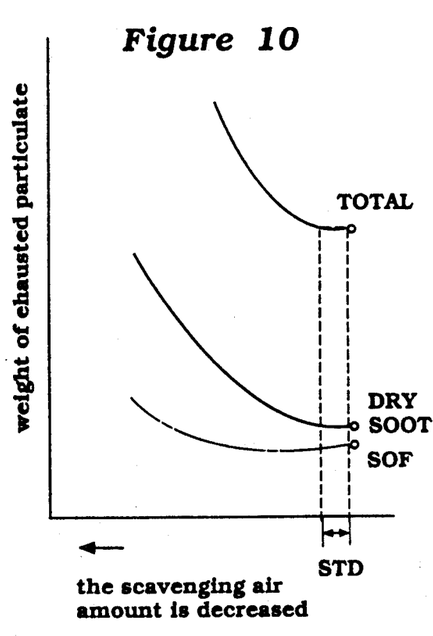

Referring first to FIGS. 8 through 10 and initially to FIG. 8, this is a curve of engine particulate emissions in relation to engine load. The engine exhaust particulates fall into two generally types, those which are insolvable in organic solvents (dry soot) and those which are solvable in organic solvents (solvable organic fraction-SOF). The main constituent of dry soot is carbon whereas the main constituent of SOF is unburn hydrocarbons.

As may be seen in FIG. 8, with a normal engine not having the control valves 52 or, the illustrated embodiment with the control valves 52 held in their closed positions, at low loads the amount of dry soot is relatively low and increasing as the engine reaches the mid load range and then continues to increase as the engine load continues to increase. SOF emissions, on the other hand, are high at low load ranges and then fall off toward mid range, increasing again at the high load conditions. The total soot emissions are shown also in this figure.

The effect of controlling the scavenge amount by opening of the control valves 52 under low load conditions at the point $X_1$ is shown in FIG. 9. This shows the amount of decreasing the ratio of scavenging air amount on dry soot, SOF and total particulate emissions. As may be seen, if the scavenging air amount is reduced from standard, the SOF emissions will decrease markly while the dry soot emissions will increase only as the scavenging air amount is significantly reduced. Therefore, by picking the appropriate point on the curve, the total soot emissions can be reduced and the type of emissions controlled.

On the other hand, when operating at a higher load condition at the point $X_2$, decreasing the amount of scavenging air will reduce the SOF emissions slightly but will increase the dry soot emissions. Hence, the amount of control of the control valves at this point will have no significant advantageous result and the scavenging air reduction amount rate at medium load should be relatively small to control particulate emissions.

Figure 11:
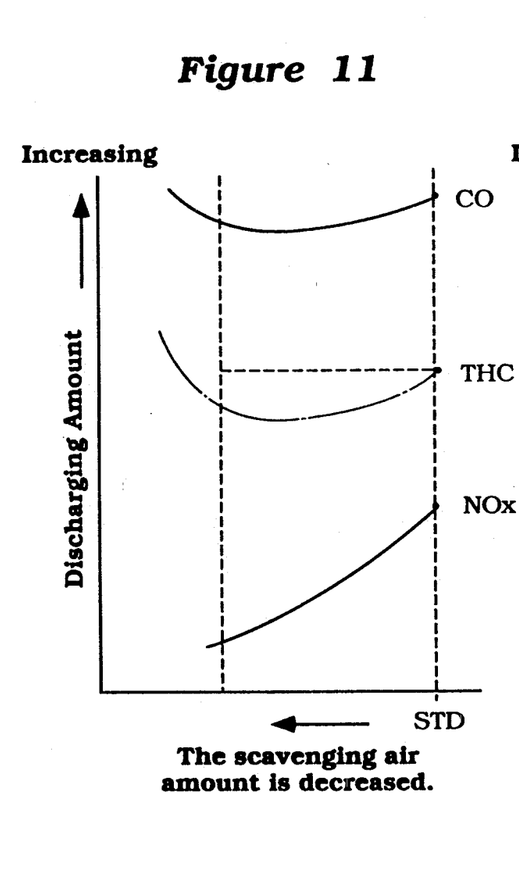
FIGS. 11 and 12 are graphical views showing the amount of certain exhaust gas constituents in relation to the amount of scavenging air.

FIG. 11 shows the effect of scavenging air flow at the point $X_1$ on carbon monoxide, unburned hydrocarbon and NOX emissions (CO, THC and NOX) respectively. As may be seen, reducing the amount of scavenging air flow will reduce all of these emissions up to a point and beyond that point, CO and THC emissions will rise while NOX emissions will continue to fall. Therefore, it is also desirable to open the control valves 52 to a wider extent at the point $X_1$ to control these emissions.

Figure 12:
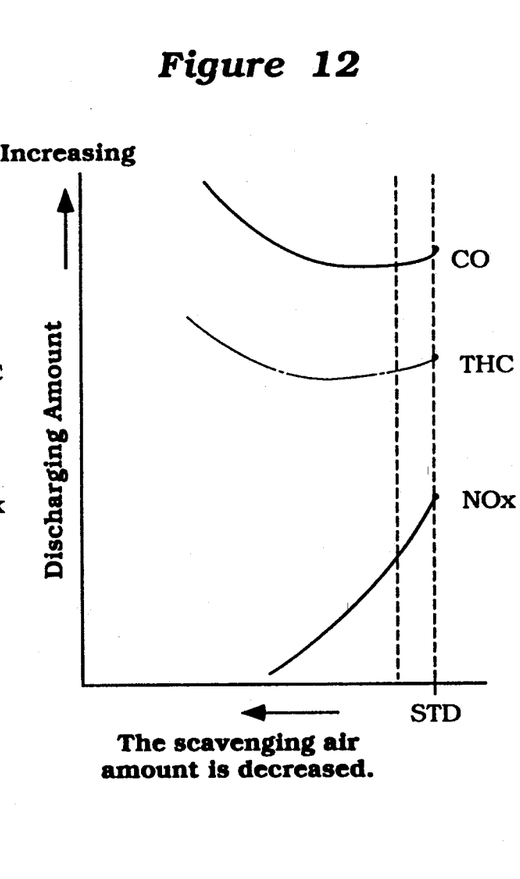

On the other hand, at the point $X_2$ as shown in FIG. 12, the NOX emissions can still be continued to be reduced as the amount of scavenging air is reduced but CO and THC emissions will rise and a smaller amount of scavenging air reduction is desired at this condition.

Therefore, it should be readily apparent that it is very effective to control both particulate and NOX emissions by decreasing the scavenging air flow at low and mid range loads. The amount of scavenging air reduction will decrease as the amount of load increases as aforedescribed.

In the embodiment thus far described, the balance passage 49 has been positioned beneath the crankcase chambers 31 and the passages 51 communicating the balance passage 49 with the individual crankcase chambers extended vertically downwardly. As a result of this construction, lubricant which condenses in the crankcase chambers 31 can flow into and accumulate in the balance passage 49 rather than being swept back into the air charge that is delivered through the scavenge passages 37 to the combustion chamber. This has obvious disadvantages.

Figures 14, 15:
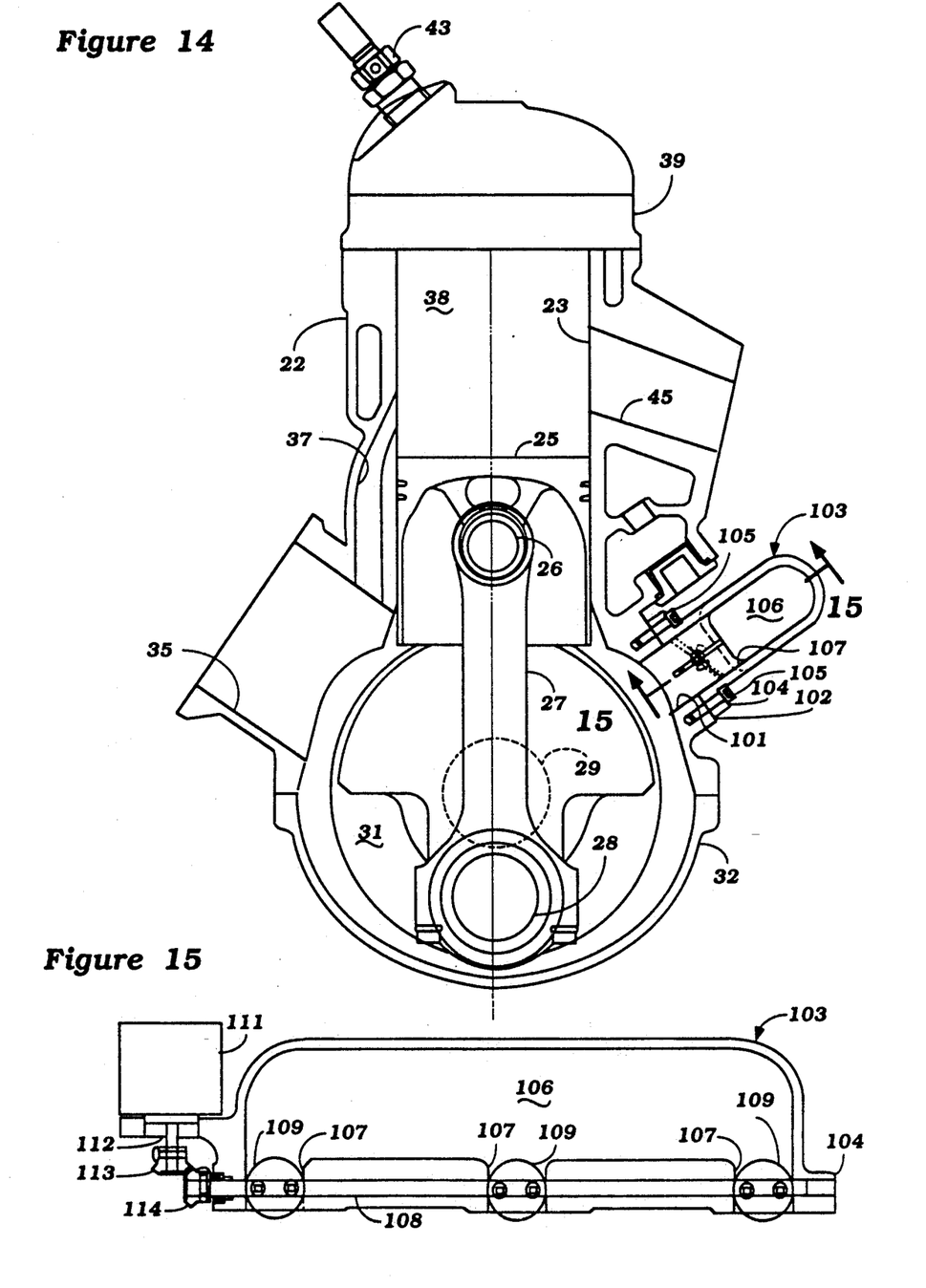
FIG. 14 is a cross sectional view, in part similar to FIG. 1, and shows another embodiment of the invention.
FIG. 15 is a cross sectional view taken along the line 15—15 of FIG. 14.

FIGS. 14 and 15 show another embodiment of the invention wherein these disadvantages are avoided. In this embodiment, certain components have been deleted and the basic components of the engine have been identified by the same reference numerals as previously employed. Where any details of the basic engine are not depicted, they may be considered to be conventional or the same as that previously described.

In this embodiment, the skirt portion of the cylinder block 22 which forms the upper portion of the crankcase chambers 31 is formed with three individual openings 101, one for each crankcase chamber 31 that extend through an outer flange 102 formed on the cylinder block 22. A balance passage forming manifold, indicated generally by the reference numeral 103 has a flange portion 104 that is affixed to the cylinder block flange 102 by threaded fasteners 105.

The manifold 103 defines a longitudinally extending balance passage 106 and individual runners 107 which form communicating passageways along with the cylinder block openings 101 that interconnect each of the crankcase chambers 31 with the balance passage 106. A throttle valve shaft 108 is rotatably journalled in the flange portion 104 and carries individual butterfly type throttle valves 109 that control the flow through each of the passages 107 in a manner previously described.

A stepping motor 111 is affixed to the side of the manifold forming member 103 and has an output shaft 112 to which a bevel gear 113 is affixed. The bevel gear 113 drives a driven bevel gear 114 affixed to the throttle valve shaft 108 for operating the control valves 109 in a control strategy of the type previously described.

In all other regards, this embodiment is the same as that previously described and, for that reason, further description of the construction and operation is not believed to be necessary. However, it should be noted that the passages 101 and 107 extend vertically upwardly from a lower point wherein they open to the crankcase chambers 31 and an upper point wherein they open to the balance passageway 106. Also, this opening is at the lower end of the balance passageway 106 and, therefore, the possibilities of any lubricant collecting in the balance system is completely avoided. Furthermore, if any lubricant does enter this system it will readily drain back into the crankcase chambers 31.

The invention of this embodiment has been described in conjunction with the problem of lubricant condensation in the crankcase chambers. If the engine is supplied with fuel through the crankcase in addition to or in lieu of the direct cylinder injection of the depicted embodiments, similar problems can result with fuel condensation in the crankcase chambers. The construction of the embodiment of FIGS. 14 and 15 will avoid these problems in connection with fuel condensation as well as lubricant condensation.

From the foregoing description, it should be readily apparent that the described embodiments are extremely effective in providing good control of exhaust emissions in a two cycle engine through the throttling of scavenge air flow without resulting in negative pressure conditions in the crankcase chambers that will cause exhaust gases to flow back into the crankcase chambers. Of course, the foregoing description in that of preferred embodiments of the invention and various changes and modifications may be made without departing from the spirit and scope of the invention, as defined by the appended claims.

I claim:

1. A two cycle, crankcase compression, internal combustion engine having at least three crankcase chambers to which an air charge is admitted, scavenge passages for transferring the charge from each of said crankcase chambers to respective combustion chambers, a balance passage, means interconnecting each of said crankcase chambers independently with said balance passage, and control valve means for controlling the communication of said crankcase chambers with said interconnecting means for controlling the communication of said crankcase chambers with each other through said balance passage.

2. A two cycle, crankcase compression, internal combustion engine as set forth in claim 1 further including means independent of the balance passage for introducing an air charge to the crankcase chambers.

3. A two cycle, crankcase compression, internal combustion engine as set forth in claim 1 wherein the engine operates on a diesel cycle and fuel is injected into the combustion chambers for combustion.

4. A two cycle, crankcase compression, internal combustion engine as set forth in claim 3 further including means independent of the balance passage means for introducing an air charge to the crankcase chambers.

5. A two cycle, crankcase compression, internal combustion engine as set forth in claim 1 wherein there are provided means for operating the control valve means for opening the control valve means at low and mid range loads and closing the control valve means at higher loads.

6. A two cycle, crankcase compression, internal combustion engine as set forth in claim 1 having each crankcase chamber communicating with the balance passage with interconnecting means having said control valve means therein.

7. A two cycle, crankcase compression, internal combustion engine having at least two crankcase chambers to which an air charge is admitted, scavenge passages for transferring a charge from said crankcase chambers to a respective combustion chamber, a balance passage, means interconnecting each of said crankcase chambers independently with said balance passage, and control valve means for controlling the communication of said crankcase chambers with said interconnecting means for controlling the communication of said crankcase chambers with each other through said balance passage, said balance passage being disposed externally of said crankcase chambers.

8. A two cycle, crankcase compression, internal combustion engine as set forth in claim 7 wherein the engine has at least three crankcase chambers, each communicating with the balance passage with interconnecting means having said control valve means therein.

9. A two cycle, crankcase compression, internal combustion engine as set forth in claim 1 wherein the means interconnecting each of the crankcase chambers independently with the balance passage comprises a plurality of interconnecting passages each communicating at one end with a respective crankcase chamber and at the other end with the balance passage, each communicating passage extending upwardly from its one end so that fluid collecting therein will flow back to the crankcase chamber.

10. A two cycle, crankcase compression, internal combustion engine as set forth in claim 9 wherein the balance passage is positioned vertically above the crankcase chambers.

11. A two cycle, crankcase compression, internal combustion engine having at least two crankcase chambers to which an air charge is admitted, scavenge passages for transferring a charge from said crankcase chambers to a combustion chamber, balance passage, and communicating conduits each communicating at one end with said balance passage and at the other end with a respective one of said crankcase chambers, said communicating conduits each extending upwardly from their one ends so as to return any lubricant collecting therein to the respective crankcase chamber.

12. A two cycle, crankcase compression, internal combustion engine as set forth in claim 11 wherein the balance passage is positioned vertically above the crankcase chambers.

13. A two cycle, crankcase compression, internal combustion engine as set forth in claim 11 further including means independent of the balance passage for introducing an air charge to the crankcase chambers.

14. A two cycle, crankcase compression, internal combustion engine as set forth in claim 11 wherein the engine operates on a diesel cycle and fuel is injected into the combustion chambers for combustion.

15. A two cycle, crankcase compression, internal combustion engine as set forth in claim 14 further including means independent of the balance passage means for introducing an air charge to the crankcase chambers.

16. A two cycle, crankcase compression, internal combustion engine as set forth in claim 11 further including control valve means for controlling the flow through each of said communicating conduits.

17. A two cycle, crankcase compression, internal combustion engine as set forth in claim 16 wherein there are provided means for operating the control valve means for opening the control valve means at low and mid range loads and closing the control valve means at higher loads.

18. A two cycle, crankcase compression, internal combustion engine as set forth in claim 17 further including means independent of the balance passage for introducing an air charge to the crankcase chambers.

19. A two cycle, crankcase compression, internal combustion engine as set forth in claim 17 wherein the engine operates on a diesel cycle and fuel is injected into the combustion chambers for combustion.

20. A two cycle, crankcase compression, internal combustion engine as set forth in claim 19 further including means independent of the balance passage means for introducing an air charge to the crankcase chambers.

* * * * *

UNITED STATES PATENT AND TRADEMARK OFFICE
CERTIFICATE OF CORRECTION

PATENT NO. : 5,251,584

DATED : October 12, 1993

INVENTOR(S) : Akihiko Ohkubo

It is certified that error appears in the above-indentified patent and that said Letters Patent is hereby corrected as shown below:

Column 10, line 27, Claim 20, after "passage" delete --means--.

Signed and Sealed this

Thirteenth Day of September, 1994

Attest:

BRUCE LEHMAN

*Attesting Officer*   *Commissioner of Patents and Trademarks*